United States Patent
Steely, Jr. et al.

(10) Patent No.: US 9,588,889 B2
(45) Date of Patent: Mar. 7, 2017

(54) DOMAIN STATE

(75) Inventors: Simon C. Steely, Jr., Hudson, NH (US); William C. Hasenplaugh, Boston, MA (US); Joel S. Emer, Hudson, MA (US)

(73) Assignee: INTEL CORPORATION, Santa Clara, CA (US)

( * ) Notice: Subject to any disclaimer, the term of this patent is extended or adjusted under 35 U.S.C. 154(b) by 573 days.

(21) Appl. No.: 13/995,991

(22) PCT Filed: Dec. 29, 2011

(86) PCT No.: PCT/US2011/067845
§ 371 (c)(1),
(2), (4) Date: Jun. 20, 2013

(87) PCT Pub. No.: WO2013/101065
PCT Pub. Date: Jul. 4, 2013

(65) Prior Publication Data
US 2014/0052920 A1     Feb. 20, 2014

(51) Int. Cl.
*G06F 12/08* (2016.01)
*G06F 13/00* (2006.01)

(52) U.S. Cl.
CPC ...... *G06F 12/0802* (2013.01); *G06F 12/0817* (2013.01); *G06F 13/00* (2013.01); *G06F 12/0811* (2013.01)

(58) Field of Classification Search
CPC .................. G06F 12/0817; G06F 12/0811
See application file for complete search history.

(56) References Cited

U.S. PATENT DOCUMENTS

| 2004/0010610 | A1 | 1/2004 | Cypher |
| 2004/0268059 | A1 | 12/2004 | Landin et al. |
| 2006/0224833 | A1* | 10/2006 | Guthrie ............... G06F 12/0811 711/141 |
| 2007/0168618 | A1* | 7/2007 | Clark ................... G06F 12/0831 711/141 |

OTHER PUBLICATIONS

International Search Report and Written Opinion issued on Apr. 27, 2012, for counterpart International Application No. PCT/US2011/67845.

* cited by examiner

*Primary Examiner* — Eric S Cardwell
(74) *Attorney, Agent, or Firm* — Andrews Kurth Kenyon LLP

(57) ABSTRACT

Method and apparatus to efficiently maintain cache coherency by reading/writing a domain state field associated with a tag entry within a cache tag directory. A value may be assigned to a domain state field of a tag entry in a cache tag directory. The cache tag directory may belong to a hierarchy of cache tag directories. Each tag entry may be associated with a cache line from a cache belonging to a first domain. The first domain may contain multiple caches. The value of the domain state field may indicate whether its associated cache line can be read or changed.

35 Claims, 6 Drawing Sheets

DOMAIN STATE

This invention was made with U.S. Government support under contract number H98230-11-3-0011 awarded by the Department of Defense. The government has certain rights in this invention.

FIELD OF THE INVENTION

The present disclosure pertains to the field of processors and, in particular, to optimizing cache management techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. However, the execution of more threads and tasks put an increased premium on shared resources, such as memory, and the management thereof.

Typically, cache memory includes a memory between a shared system memory and execution units of a processor to hold information in a closer proximity to the execution units. In addition, cache is typically smaller in size than a main system memory, which allows for the cache to be constructed from expensive, faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level (L2) cache, which may also reside on the processor but be placed between the first level cache and main memory. And a third level (L3) cache may be placed on the processor or elsewhere in the computer system, such as at a controller hub, between the second level cache and main memory.

Cache coherence is a useful mechanism in multiple processor systems to provide a shared memory abstraction to the programmer. When multiple processors cache a given shared memory location, a cache coherence problem may arise because a copy of the same memory location exists in multiple caches. A cache coherence protocol guarantees that a given memory location has a consistent view across all processors. There are many models of what a consistent view is, and one example is sequential consistency. Another is weak ordering. In each of these models, the coherence protocol prescribes a legal order in which memory locations can be acquired by and updated by various processors.

One conventional technique for maintaining cache coherency, particularly in distributed systems, is a directory-based cache coherency scheme. Directory-based coherency schemes utilize a centralized tag directory to record the location and the status of cache lines as they exist throughout the system. For example, the tag directory records which processor caches have a copy of the data, and further records if any of the caches have an updated copy of the data. When a processor makes a cache request to the main memory for a data item, the tag directory is consulted to determine where the most recent copy of the data resides. Based on this information, the most recent copy of the cache line is retrieved so that it may be provided to the requesting processor cache memory. The tag directory is then updated to reflect the new status for that cache line. Thus, each cache line read by a processor is accompanied by a tag directory update (i.e., a write). The directory-based cache coherency scheme may include multiple tag directories, and the tag directories may be arranged in a hierarchy. Furthermore, a hierarchical tag directory structure may include any number of levels.

DESCRIPTION OF THE FIGURES

Embodiments are illustrated by way of example and not limitation in the Figures of the accompanying drawings.

DETAILED DESCRIPTION

Figure 1:
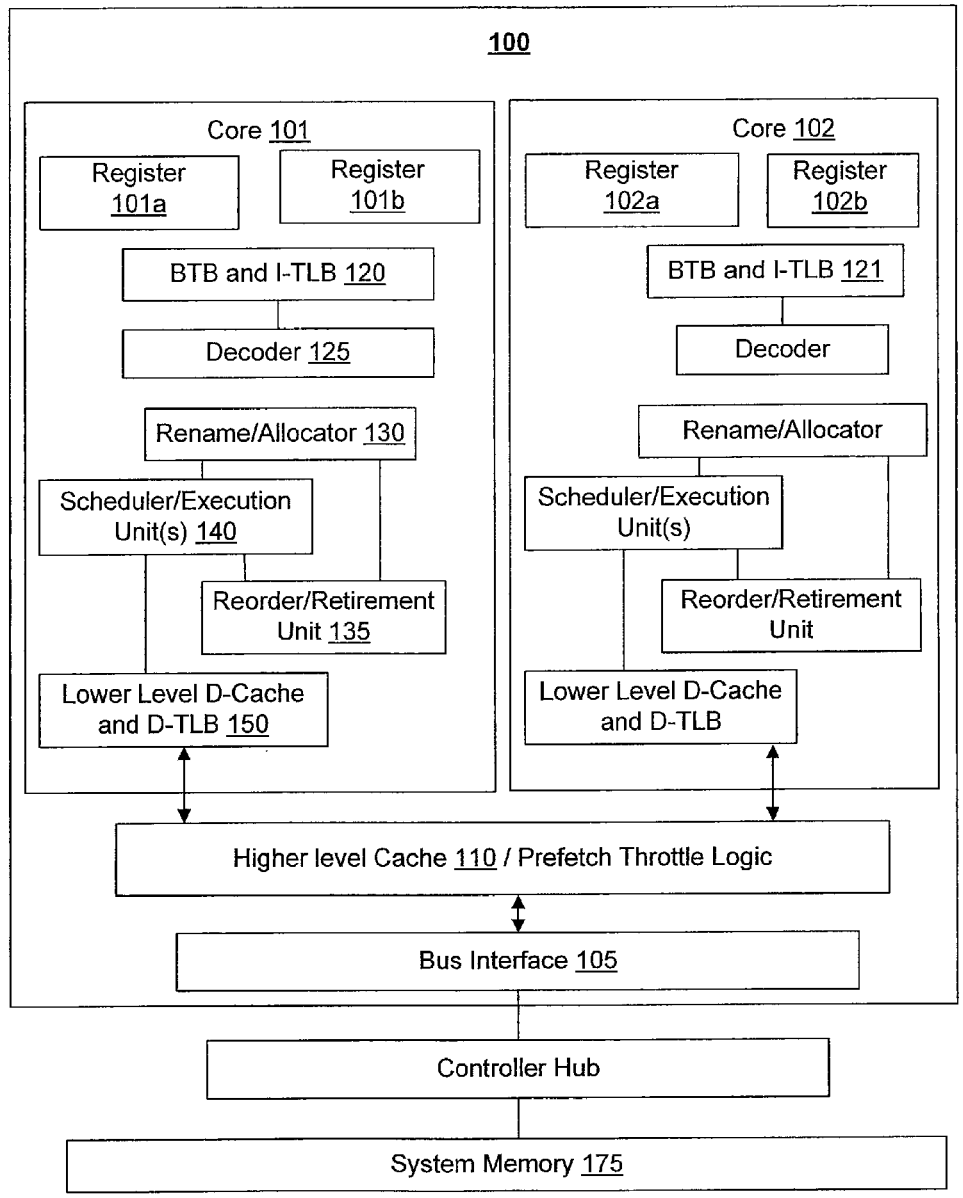
FIG. 1 illustrates an embodiment of a processor including multiple processing elements.

In the following description, numerous specific details are set forth such as examples of specific hardware structures for determining cache lines, reading/writing to domain state fields, determining target caches, and determining domains, as well as placement of such hardware structures, such as at memory ports or at independent cache slices; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific un-core logic, specific memory controller logic, specific cache implementations, specific cache coherency protocols, and specific operational details of microprocessors, have not been described in detail in order to avoid unnecessarily obscuring the present invention.

Embodiments may be discussed herein which efficiently maintain cache coherency. In particular, embodiments of the present invention pertain to a feature for reading/writing a domain state field associated with a tag entry within a cache tag directory. In an embodiment, a value may be assigned to a domain state field of a tag entry in a cache tag directory. The cache tag directory may belong to a hierarchy of cache tag directories. Each tag entry may be associated with a cache line from a cache belonging to a domain. The domain may contain multiple caches. The value of the domain state field may indicate whether its associated cache line can be read or changed.

In an embodiment, the domain state field may be assigned a value indicating that the domain state field's associated domain has the only copies of its associated cache line. In an embodiment, the domain state field may be assigned a value indicating that the domain state field's associated domain is a last accessor of its associated cache line, and at least one other domain has or had a copy of that cache line. In an embodiment, the domain state field may be assigned a value indicating that the domain state field's associated domain is not the last accessor of the cache line, and all domains in the hierarchy of cache tag directories are up to date with memory. In an embodiment, the domain state field may be assigned a value indicating that the domain state field's associated domain is not the last accessor of the cache line, and a global last accessor domain has a copy of the cache line which is not up to date with memory.

In an embodiment, the domain state field may be assigned a value indicating that all read requests and all write requests for its associated cache line can only be serviced in the domain state field's associated domain. In an embodiment, the domain state field may be assigned a value indicating that all read requests for the cache line can be serviced in the domain state field's associated domain, that no write requests for the cache line can be serviced in the domain state field's associated domain, and that write requests for the cache line must go to a next level of the hierarchy of cache tag directories. In an embodiment, the domain state field may be assigned a value indicating that no read requests or write requests for the cache line can be serviced in the domain state field's associated domain, and that read requests or write requests for the cache line must go to a next level of the hierarchy of cache tag directories.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or furtherout refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a Northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an un-core module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a collocated core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 211-214 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache. As a specific example, the cache may include a physical centralized cache with a similarly centralized tag directory, such as higher level cache 110. Alternatively, the tag directories may be either physically and/or logically distributed in a physically distributed cache, such as the cache organization illustrated in FIG. 2.

Figure 2:
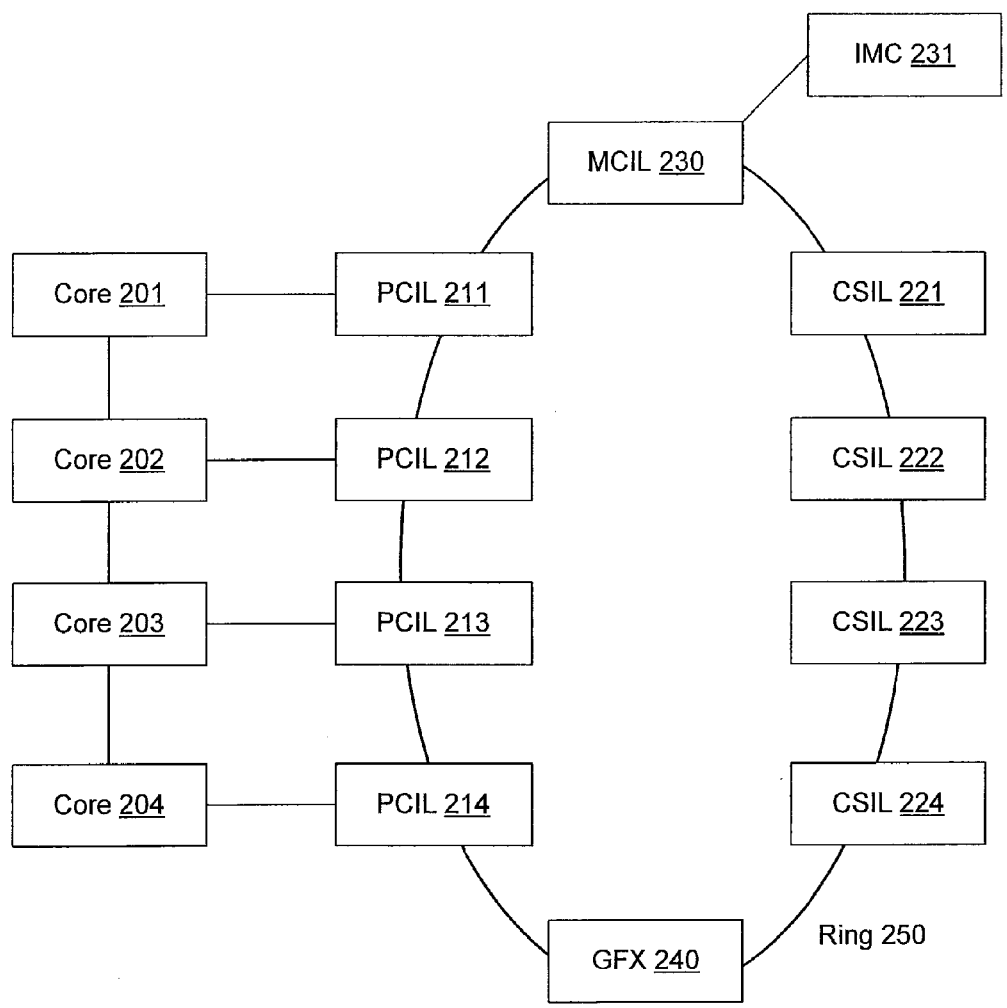
FIG. 2 illustrates an embodiment of on-core memory interface logic.
Figure 3:
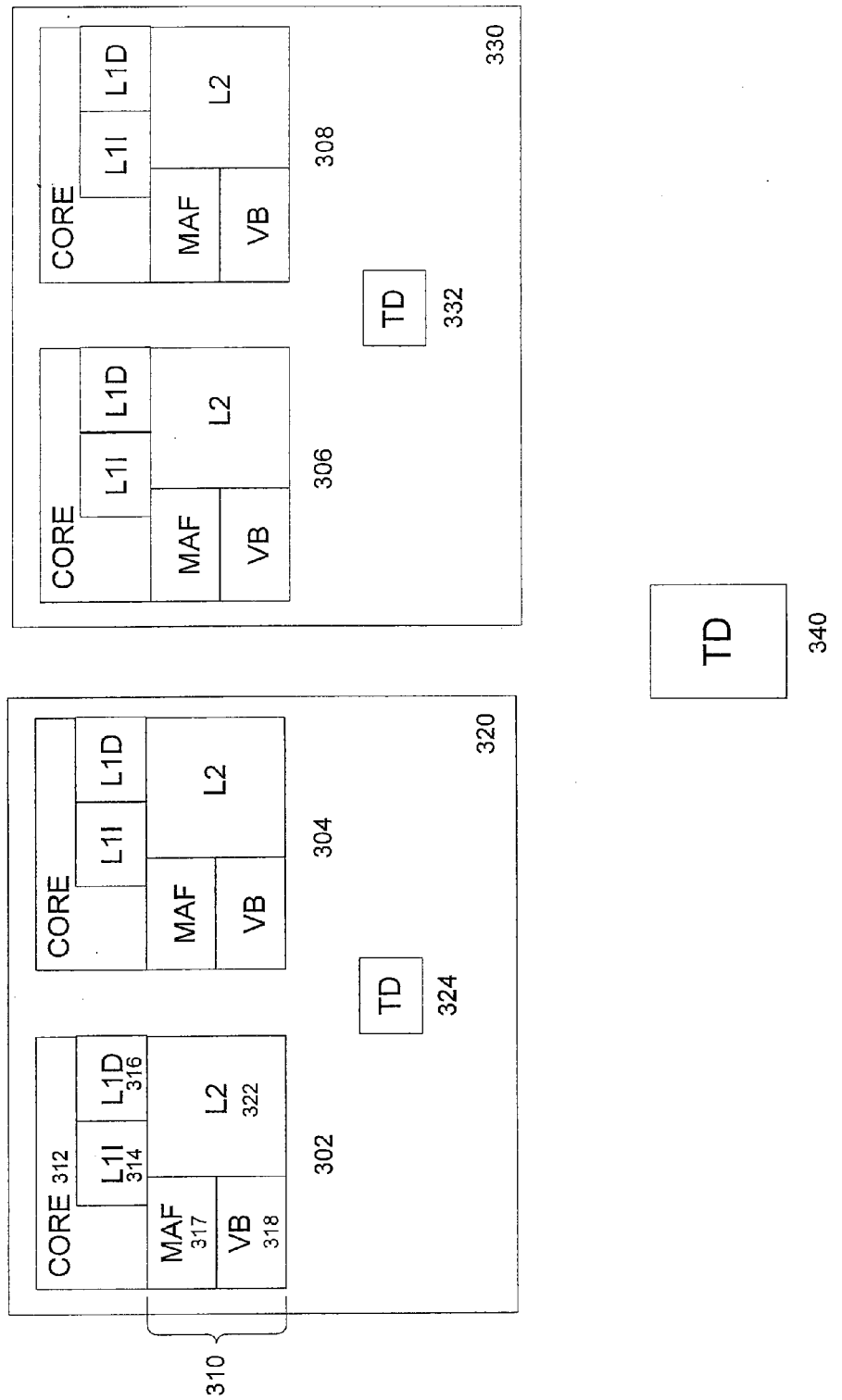
FIG. 3 illustrates an embodiment of multiple processors and tag directories in a hierarchy.

In an embodiment, a processor, such as the processor illustrated in FIG. 1, illustrated in FIG. 2, or any other processor, includes one or more caches. FIG. 3 illustrates an embodiment processor(s) with multiple cores/un-cores. Each processor may include at least a core 312 and at least an un-core 310. In an embodiment, 302, 304, 306, and 308 may be cores/un-cores which are part of a single processor. In another embodiment, 302, 304, 306, and 308 may be multiple processors. The core 312 may include components of the processor involved in executing instructions. The un-core 310 may include all logic not in the core 312, but which are essential for core performance. The core 312 may include components such as an L1 instruction cache (L1I) 314 and a L1 data cache (L1D) 316. The un-core 310 may include components such as a missing address file (MAF) 317, victim buffer (VB) 318, and L2 cache (L2) 322. One or more processors, one or more cores, or one or more un-cores, and their caches may be associated with a domain. In an embodiment, illustrated in FIG. 3, processors 302 and 304, and their cores, un-cores, and caches are associated with domain 320. A tag directory (TD) 324 may represent data in caches in domain 320. Similarly, processors 306 and 308, and their cores, un-cores, and caches may be associated with domain 330. A TD 332 may represent data in caches in domain 330. A TD 340 may represent data in caches in multiple domains 320 and 330. In other words, the TD structure may be a hierarchy, where TD 324 and TD 332 are on one level of the hierarchy and TD 340 is on the next level. Although only two levels in a TD hierarchy have been illustrated in FIG. 3, other embodiments may include any number of levels in a TD hierarchy.

If a request for a cache line misses the L1D cache 316, the request may check for the same cache line in the L2 cache 322. If the cache line is not in the L2 cache 322, then the request may continue to check the TD 324 to find out whether the cache line is located in one of the caches controlled by the neighboring cores in the same domain 320 (i.e., the caches in 304). Even if a copy of the cache line is found in a neighboring cache in the same domain 320, there may be other copies of the cache line in other domains (for example, domain 330), which must be accounted for from a cache coherence perspective. Therefore, the request may need to continue to the TD 340, and check if any other domains also have a copy of the cache line.

Figure 4:
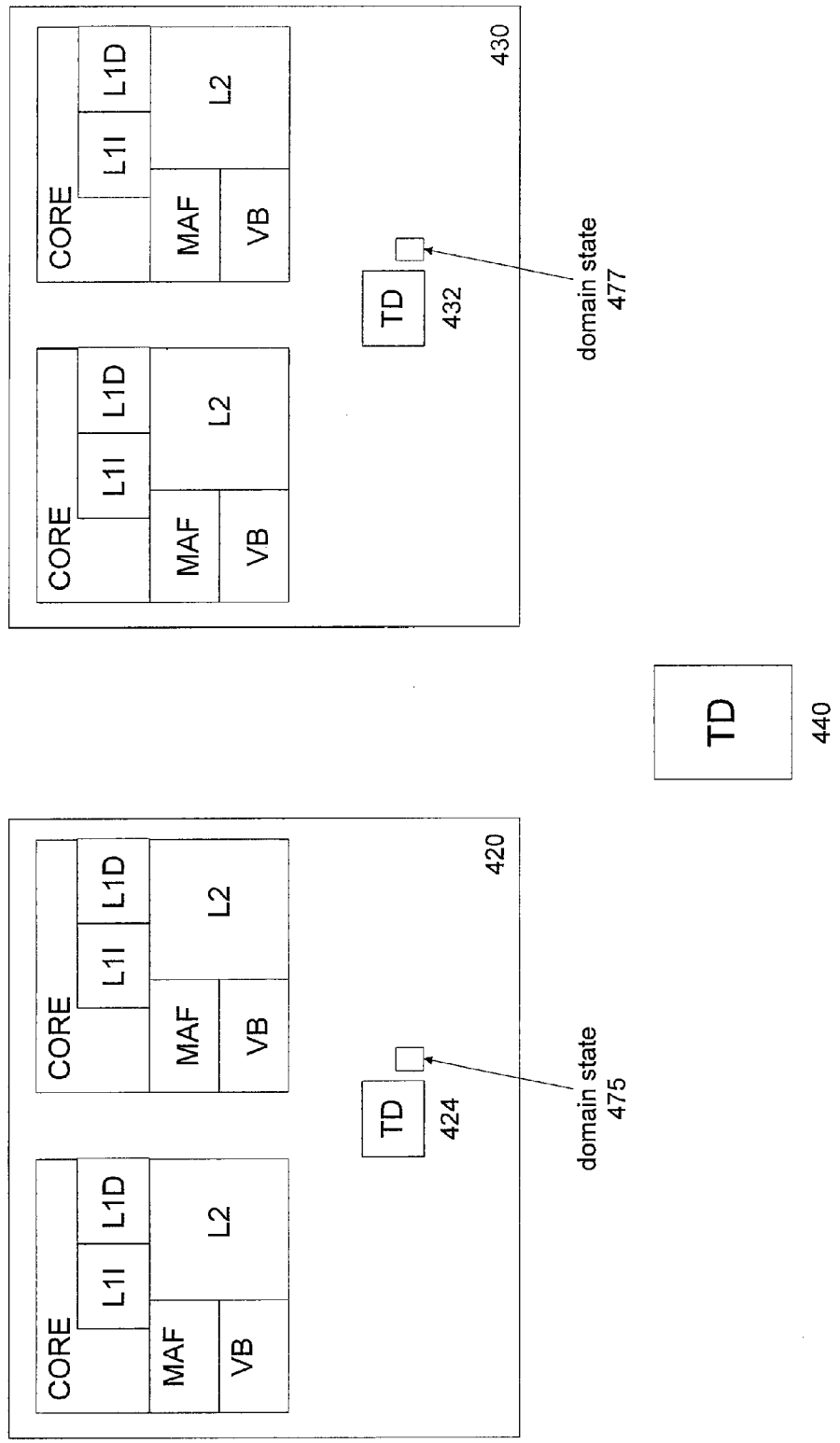
FIG. 4 illustrates an embodiment of multiple processors, tag directories in a hierarchy, and a domain state field.

With a hierarchical tag directory structure as shown in FIG. 3, it may be advantageous (with regards to reducing energy and latency) to resolve requests for cache lines by only accessing the local domain (for example, 324) without accessing other domains (for example, 332 and 340). To achieve this, a new field per tag entry may be used. In an embodiment, as illustrated in FIG. 4, TDs 424 and 425 have a new field per tag entry (which in turn is associated with a cache line). The new field may be called domain state (475, 477), and may indicate information about a cache line in a manner that minimizes the number of TDs which need to be accessed by a request for a cache line.

In an embodiment, the domain state field may include 4 values. The first value, which may be denoted by E_LA, may indicate that the current domain (i.e., the domain in which the domain state field exists) has the only copies of the cache line in the hierarchy. Referring to FIG. 4, if one of the tag entries in TD 424 had a domain state value of E_LA, that domain state value may indicate that domain 420 has the only copies of the cache line associated with that domain state field. The second value, which may be denoted by S_LA, may indicate that the current domain is the last accessor of the cache line and at least one other domain has or had a copy of the cache line. Referring to FIG. 4, if one of the tag entries in TD 424 had a domain state value of S_LA, that domain state value may indicate that domain 420 is the last accessor of the cache line associated with that domain state field, and at least one other domain (for example, 430) has or had a copy of the cache line. The third value, which may be denoted by S_NLA_S, may indicate that the current domain is not the last accessor of the cache line and all domains are up to date with memory for the cache line associated with that domain state field. Referring to FIG. 4, if one of the tag entries in TD 424 had a domain state value of S_NLA_S, that domain state value may indicate that domain 420 is not the last accessor of the cache line associated with that domain state field, and all domains (420 and 430) are up to date with memory for the cache line associated with that domain state field. The fourth value, which may be denoted by S_NLA_O, may indicate that the current domain is not the last accessor of the cache line and that the global last accessor domain has a copy that is not up to date with memory. Referring to FIG. 4, if one of the tag entries in TD 424 had a domain state value of S_NLA_O, that domain state value may indicate that domain 420 is not the last accessor of the cache line associated with that domain state field, and the global last accessor domain (for example, 430), has a copy of the cache line that is not up to date with memory.

Figure 5:
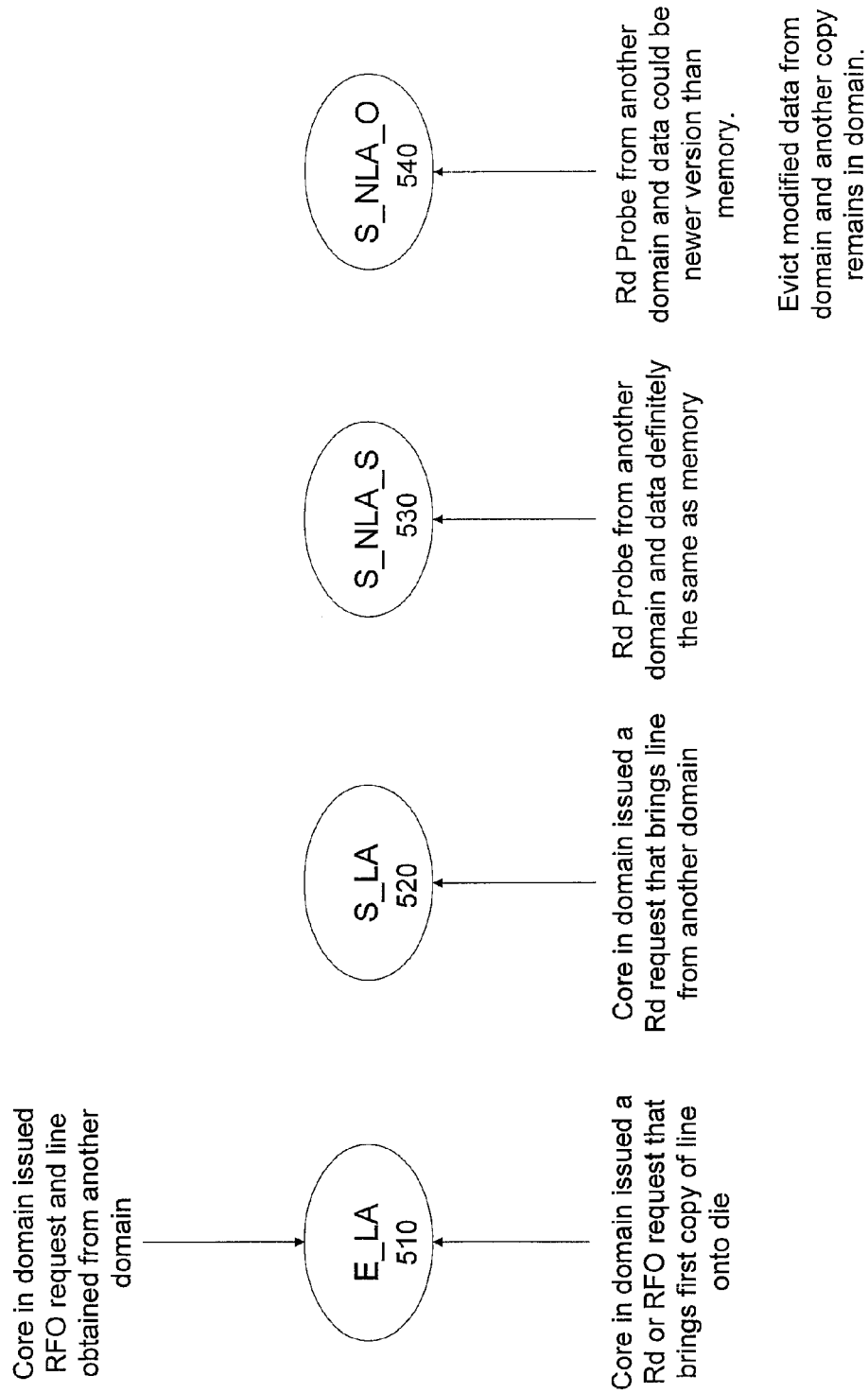
FIG. 5 illustrates, in an embodiment, various conditions which set the values of the domain state field.

FIG. 5 illustrates, in an embodiment, various conditions which set the values of the domain state field. In an embodiment, a domain state field's value may be set to E_LA 510 when a read (Rd) request, or request for ownership (RFO), i.e, an attempt to obtain a writable cache line, is issued from the domain state field's domain, resulting in the acquisition of a first copy of the cache line. In an embodiment, a domain state field's value may be set to E_LA 510 when an RFO request is issued from the domain state field's domain, and the cache line is obtained from another domain. In an embodiment, a domain state field's value may be set to S_LA 520 when a read request is issued from the domain state field's domain, and the cache line is obtained from another domain. In an embodiment, a domain state field's value may be set to S_NLA_S 530 when a read probe from another domain is issued and the cache line in this domain is the same as memory. In an embodiment, a domain state field's value may be set to S_NLA_O 540 when a read probe from another domain is issued and another domain could have a newer version of the cache line than memory. A copy of the modified cache line may then be evicted from the domain state field's domain, and other copies of the cache line may remain in the domain. In an embodiment, a domain state field's value may be set to S_NLA_O 540 when a modified cache line is evicted from the domain state field's domain, at least another copy of the cache line remains in the domain, and the current state of the domain state field is either E_LA or S_LA.

In an embodiment, the domain state field may include 3 values. The first value, which may be denoted by V1, may indicate that all write and read type requests for the requested cache line may be serviced in the domain state field's domain only. Referring to FIG. 4, if one of the tag entries in TD 424 had a domain state value of V1, that domain state value may indicate that all read and write requests may be fulfilled in domain 420 only. The second value, which may be denoted by V2, may indicate that all read type requests for the cache line may be serviced in the domain state field's domain, but the write requests may not be serviced in the domain state field's domain. Instead, the write requests may be fulfilled by the next level of the tag directory hierarchy. Referring to FIG. 4, if one of the tag entries in TD 424 had a domain state value of V2, that domain state value may indicate that all read requests for its associated cache line may be fulfilled in domain 420, but write requests may have to go to TD 440. The third value, which may be denoted by V3, may indicate that no read type requests nor write request for the cache line may be serviced in the domain state field's domain. Instead, the read/write requests may be fulfilled by the next level of the tag directory hierarchy. Referring to FIG. 4, if one of the tag entries in TD 424 had a domain state value of V3, that domain state value may indicate that all read/write requests for its associated cache line may not be fulfilled in domain 420, but the requests may have to go to TD 440.

Figure 6:
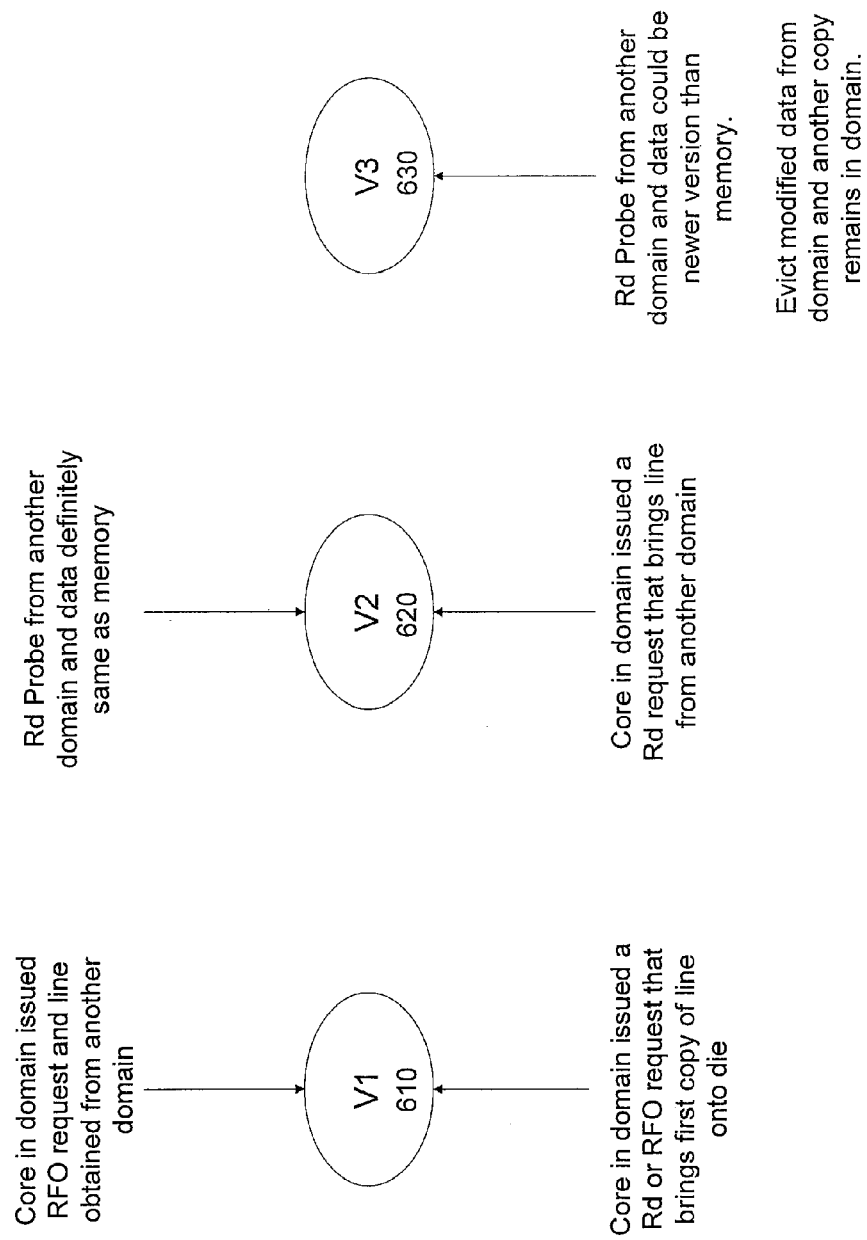
FIG. 6 illustrates, in an embodiment, various conditions which set the values of the domain state field.

FIG. 6 illustrates, in an embodiment, various conditions which set the values of the domain state field. In an embodiment, a domain state field's value may be set to V1 610 when a read (Rd) request, or request for ownership (RFO), i.e., an attempt to obtain a writable cache line, is issued from the domain state field's domain, resulting in the acquisition of a first copy of the cache line. In an embodiment, a domain state field's value may be set to V1 610 when an RFO request is issued from the domain state field's domain, and the cache line is obtained from another domain. In an embodiment, a domain state field's value may be set to V2 620 when a read request is issued from the domain state field's domain, and the cache line is obtained from another domain. In an embodiment, a domain state field's value may be set to V2 620 when a read probe from another domain is issued and the cache line in domain state field's domain is the same as memory. In an embodiment, a domain state field's value may be set to V3 630 when a read probe from another domain is issued and another domain could have a newer version of the cache line than memory. A copy of the modified cache line may be evicted from the domain state field's domain, and other copies of the cache line may remain in the domain. In an embodiment, a domain state field's value may be set to V3 630 if a modified cache line from the domain state field's domain is evicted, at least another copy of the cache line is present in the domain state field's domain, and the current value of the domain state field is V1.

A value, as used herein, includes any known representation of a number, a state, a logical state, or a binary logical state. Often, the use of logic levels, logic values, or logical values is also referred to as 1s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

What is claimed is:

1. An apparatus comprising:
   a plurality of domains, wherein
     each domain comprises one or more cores, one or more caches, and a first-level cache tag directory, wherein
       the first-level cache tag directory includes a tag entry with a domain field associated with a cache line in one of the one or more caches, wherein
       the domain state field indicates whether a request from one of the one or more cores can be serviced by one of the one or more caches without accessing a second-level cache tag directory, the second-level cache tag directory associated with data in every cache in the plurality of domains and not belonging to the plurality of domains.

2. The apparatus of claim 1, wherein the domain state field includes at least one of:
   a first value indicating that the domain associated with the domain state field has the only copies of a particular cache line,
   a second value indicating that the domain associated with the domain state field is a last accessor of the particular cache line, and at least one other domain has or had a copy of the particular cache line,
   a third value indicating that the domain associated with the domain state field is not the last accessor of the particular cache line, and all domains are up to date with memory, and
   a fourth value indicating that the domain associated with the domain state field is not the last accessor of the particular cache line, and a global last accessor domain has a copy of the particular cache line which is not up to date with memory.

3. The apparatus of claim 2, wherein the domain state field is set to the first value if a read request or request for ownership for a cache line associated with the domain state field is issued from the domain associated with the domain state field and a first copy of the cache line is obtained and stored in the domain associated with the domain state field.

4. The apparatus of claim 2, wherein the domain state field is set to the first value if a request for ownership for a cache line associated with the domain state field is issued from the domain associated with the domain state field and a copy of the cache line is obtained from another domain.

5. The apparatus of claim 2, wherein the domain state field is set to the second value if a read request for a cache line associated with the domain state field is issued from the domain associated with the domain state field and a copy of the cache line is obtained from another domain.

6. The apparatus of claim 2, wherein the domain state field is set to the third value if a read probe is issued to the domain associated with the domain state field from another domain for a cache line in the domain associated with the domain state field and the cache line in the domain associated with the domain state field is the same as an associated cache line in memory.

7. The apparatus of claim 2, wherein the domain state field is set to the fourth value if a read probe is issued to the domain associated with the domain state field from another domain for a cache line in the domain associated with the domain state field and a another domain could have a newer copy of the cache line than an associated cache line in memory.

8. The apparatus of claim 2, wherein the domain state field is set to the fourth value if a modified cache line from the domain associated with the domain state field is evicted, at least one other copy of the cache line is in the domain associated with the domain state field, and a current value of the domain state field is one of the first value and the second value.

9. The apparatus of claim 1, wherein the domain state field includes at least one of:
   a first value indicating that all read requests and all write requests for a particular cache line can only be serviced in the domain associated with the domain state field,
   a second value indicating that all read requests for the particular cache line can be serviced in the domain associated with the domain state field, that no write requests for the particular cache line can be serviced in the domain associated with the domain state field, and that write requests for the particular cache line must go to the second-level cache tag directory, and
   a third value indicating that no read requests or write requests for the particular cache line can be serviced in the domain associated with the domain state field, and that read requests or write requests for the cache line must go to the second-level cache tag directory.

10. The apparatus of claim 9, wherein the domain state field is set to the first value if a read request or request for ownership for a cache line associated with the domain state field is issued from the domain associated with the domain state field and a first copy of the cache line is obtained and stored in the domain associated with the domain state field.

11. The apparatus of claim 9, wherein the domain state field is set to the first value if a request for ownership for a cache line associated with the domain state field is issued from the domain associated with the domain state field and a copy of the cache line is obtained from another domain.

12. The apparatus of claim 9, wherein the domain state field is set to the second value if a read request for a cache line associated with the domain state field is issued from the domain associated with the domain state field and a copy of the cache line is obtained from another domain.

13. The apparatus of claim 9, wherein the domain state field is set to the second value if a read probe is issued to the domain associated with the domain state field from another domain for a cache line in the domain associated with the domain state field and the cache line in the domain associated with the domain state field is the same as an associated cache line in memory.

14. The apparatus of claim 9, wherein the domain state field is set to the third value if a read probe is issued to the domain associated with the domain state field from another domain for a cache line in the domain associated with the domain state field and a another domain could have a newer copy of the cache line than an associated cache line in memory.

15. The apparatus of claim 9, wherein the domain state field is set to the third value if a modified cache line from the domain associated with the domain state field is evicted, at least another copy of the cache line is present in the domain associated with the domain state field, and a current value of the domain state field is the first value.

16. A method comprising:
   setting a value within a domain state field of a tag entry in a first-level cache tag directory belonging to a domain of a plurality of domains, wherein the domain state field is associated with a cache line in one of one or more caches belonging to the domain;
   reading the value of the domain state field; and
   based on the value of the domain state field, determining whether a request from one of one or more cores belonging to the domain can be serviced by one of the one or more caches without accessing a second-level cache tag directory associated with data in caches in the plurality of domains and not belonging to the plurality of domains.

17. The method of claim 16, wherein the domain state field includes at least one of:
   a first value indicating that the domain associated with the domain state field has the only copies of a particular cache line,
   a second value indicating that the domain associated with the domain state field is a last accessor of the particular cache line, and at least one other domain has or had a copy of the particular cache line,
   a third value indicating that the domain associated with the domain state field is not the last accessor of the particular cache line, and all domains in the hierarchy of cache tag directories are up to date with memory, and
   a fourth value indicating that the domain associated with the domain state field is not the last accessor of the particular cache line, and a global last accessor domain has a copy of the particular cache line which is not up to date with memory.

18. The method of claim 17, wherein the domain state field is set to the first value if a read request or request for ownership for a cache line associated with the domain state field is issued from the domain associated with the domain state field and a first copy of the cache line is obtained and stored in the domain associated with the domain state field.

19. The method of claim 17, wherein the domain state field is set to the first value if a request for ownership for a cache line associated with the domain state field is issued from the domain associated with the domain state field and a copy of the cache line is obtained from another domain.

20. The method of claim 17, wherein the domain state field is set to the second value if a read request for a cache line associated with the domain state field is issued from the domain associated with the domain state field and a copy of the cache line is obtained from another domain.

21. The method of claim 17, wherein the domain state field is set to the third value if a read probe is issued to the domain associated with the domain state field from another domain for a cache line in the domain associated with the domain state field and the cache line in the domain associated with the domain state field is the same as an associated cache line in memory.

22. The method of claim 17, wherein the domain state field is set to the fourth value if a read probe is issued to the domain associated with the domain state field from another domain for a cache line in the domain associated with the domain state field and a another domain could have a newer copy of the cache line than an associated cache line in memory.

23. The method of claim 17, wherein the domain state field is set to the fourth value if a modified cache line from the domain associated with the domain state field is evicted, at least one other copy of the cache line is in the domain associated with the domain state field, and a current value of the domain state field is one of the first value and the second value.

24. The method of claim 16, wherein the domain state field includes at least one of:
  a first value indicating that all read requests and all write requests for a particular cache line can only be serviced in the domain associated with the domain state field,
  a second value indicating that all read requests for the particular cache line can be serviced in the domain associated with the domain state field, that no write requests for the particular cache line can be serviced in the domain associated with the domain state field, and that write requests for the particular cache line must go to the second-level cache tag directory, and
  a third value indicating that no read requests or write requests for the particular cache line can be serviced in the domain associated with the domain state field, and that read requests or write requests for the cache line must go to the second-level cache tag directory.

25. The method of claim 24, wherein the domain state field is set to the first value if a read request or request for ownership for a cache line associated with the domain state field is issued from the domain associated with the domain state field and a first copy of the cache line is obtained and stored in the domain associated with the domain state field.

26. The method of claim 24, wherein the domain state field is set to the first value if a request for ownership for a cache line associated with the domain state field is issued from the domain associated with the domain state field and a copy of the cache line is obtained from another domain.

27. The method of claim 24, wherein the domain state field is set to the second value if a read request for a cache line associated with the domain state field is issued from the domain associated with the domain state field and a copy of the cache line is obtained from another domain.

28. The method of claim 24, wherein the domain state field is set to the second value if a read probe is issued to the domain associated with the domain state field from another domain for a cache line in the domain associated with the domain state field and the cache line in the domain associated with the domain state field is the same as an associated cache line in memory.

29. The method of claim 24, wherein the domain state field is set to the third value if a read probe is issued to the domain associated with the domain state field from another domain for a cache line in the domain associated with the domain state field and a another domain could have a newer copy of the cache line than an associated cache line in memory.

30. The method of claim 24, wherein the domain state field is set to the third value if a modified cache line from the domain associated with the domain state field is evicted, at least another copy of the cache line is present in the domain associated with the domain state field, and a current value of the domain state field is the first value.

31. An apparatus comprising:
  a first processing core belonging to a first domain of a plurality of domains and comprising a cache, the cache including a cache line;
  a first first-level cache tag directory belonging to the first domain and including a tag entry for the cache line, the tag entry including a domain state field that indicates a domain state for the cache line; and
  a second processing core belonging to the first domain and that in operation issues a data request that corresponds to the cache line and, in response, the first processing core provides the cache line to the second processing core depending on the domain state and without accessing a second-level cache tag directory, the second-level cache tag directory associated with data in caches in the plurality of domains and not belonging to the plurality of domains.

32. The apparatus of claim 31, further comprising third and fourth processing cores and a second first-level cache tag directory, the third and fourth processing cores and the second first-level cache tag directory belonging to a second domain of the plurality of domains.

33. The apparatus of claim 32, wherein the second-level cache tag directory comprises copies of the first and second first-level cache tag directories.

34. The apparatus of claim 33, wherein, in operation, the third processing core issues a second data request that corresponds to the cache line and, in response, the first processing core provides the cache line to the third processing core depending on the domain state of the domain state field of the copy of the first first-level cache tag directory within the second-level cache tag directory.

35. A machine-implemented method comprising:
  issuing a data request by a first processing core for a cache line found in a cache of a second processing core, the first and second processing cores belong to a domain of a plurality of domains; and
  providing the cache line by the second processing core to the first processing core depending upon a domain state of a domain state field of a cache tag entry of a cache tag directory belong to the domain of the first and second processing cores, without accessing a second-level cache tag directory, the second-level cache tag directory associated with data in caches in the plurality of domains and not belonging to the plurality of domains.

* * * * *

UNITED STATES PATENT AND TRADEMARK OFFICE
CERTIFICATE OF CORRECTION

PATENT NO. : 9,588,889 B2  
APPLICATION NO. : 13/995991  
DATED : March 7, 2017  
INVENTOR(S) : Simon C. Steely et al.

It is certified that error appears in the above-identified patent and that said Letters Patent is hereby corrected as shown below:

In the Claims

In Column 14, Line 19, in Claim 31, delete "that" and insert -- that, --, therefor.

In Column 14, Line 19, in Claim 31, delete "operation" and insert -- operation, --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*